United States Patent [19]

Seelenbinder et al.

[11] 4,299,472
[45] Nov. 10, 1981

[54] DEVELOPER APPARATUS

[75] Inventors: Terry G. Seelenbinder, Elk Grove Village; Walter A. Hudson, Fox River Grove, both of Ill.

[73] Assignee: AM International, Inc., Los Angeles, Calif.

[21] Appl. No.: 159,258

[22] Filed: Jun. 13, 1980

[51] Int. Cl.³ .............................................. G03D 5/06
[52] U.S. Cl. .................................. 354/318; 118/260; 118/261
[58] Field of Search ...................... 354/318, 324, 317; 118/248, 260, 261; 352/130

[56] References Cited

U.S. PATENT DOCUMENTS

| | | | |
|---|---|---|---|
| 2,036,972 | 4/1936 | Storck | 118/260 |
| 2,534,765 | 12/1950 | Genz | 118/260 |
| 2,698,453 | 1/1955 | Garrow | 118/261 |
| 3,262,381 | 7/1966 | Zimmerman | 352/130 |
| 3,309,992 | 3/1967 | Motter | 118/261 |
| 3,498,203 | 3/1970 | Chen | 354/317 |
| 3,702,096 | 11/1972 | Copeland | 354/318 |
| 3,704,661 | 12/1972 | Johnson et al. | 354/318 |
| 3,704,662 | 12/1972 | Johnson et al. | 354/318 |
| 3,969,742 | 7/1976 | McCabe | 354/318 |
| 4,158,495 | 6/1979 | Seelenbinder et al. | 354/324 |

Primary Examiner—L. T. Hix
Assistant Examiner—Alan Mathews
Attorney, Agent, or Firm—Robert C. Curfiss; Anthony W. Karambelas

[57] ABSTRACT

In a developing apparatus for developing exposed copy sheets with liquid developer, which apparatus employs an applicator roll for the developer liquid and metering and pressure blades in contact with the applicator roll for controlling the development process, there is provided a wick for applying the developer liquid to the roll. Means is provided for moving the wick into and out of contact with the surface of the applicator roll so that the wick may be withdrawn whenever the apparatus is stopped in order to allow uniform drying of the roll surface to forestall the possibility of non uniform development treatment which otherwise might occur when the apparatus is next used. The apparatus also comprises a special support for the bar which carries the metering blade, the bar being rockably carried in support plates which are pivoted on the frame and adjustable while the apparatus is operating to adjust the attitude of the metering blade relative to the applicator roll surface and thereby control the amount of developer liquid which the roll surface is applying to the copy sheets.

6 Claims, 9 Drawing Figures

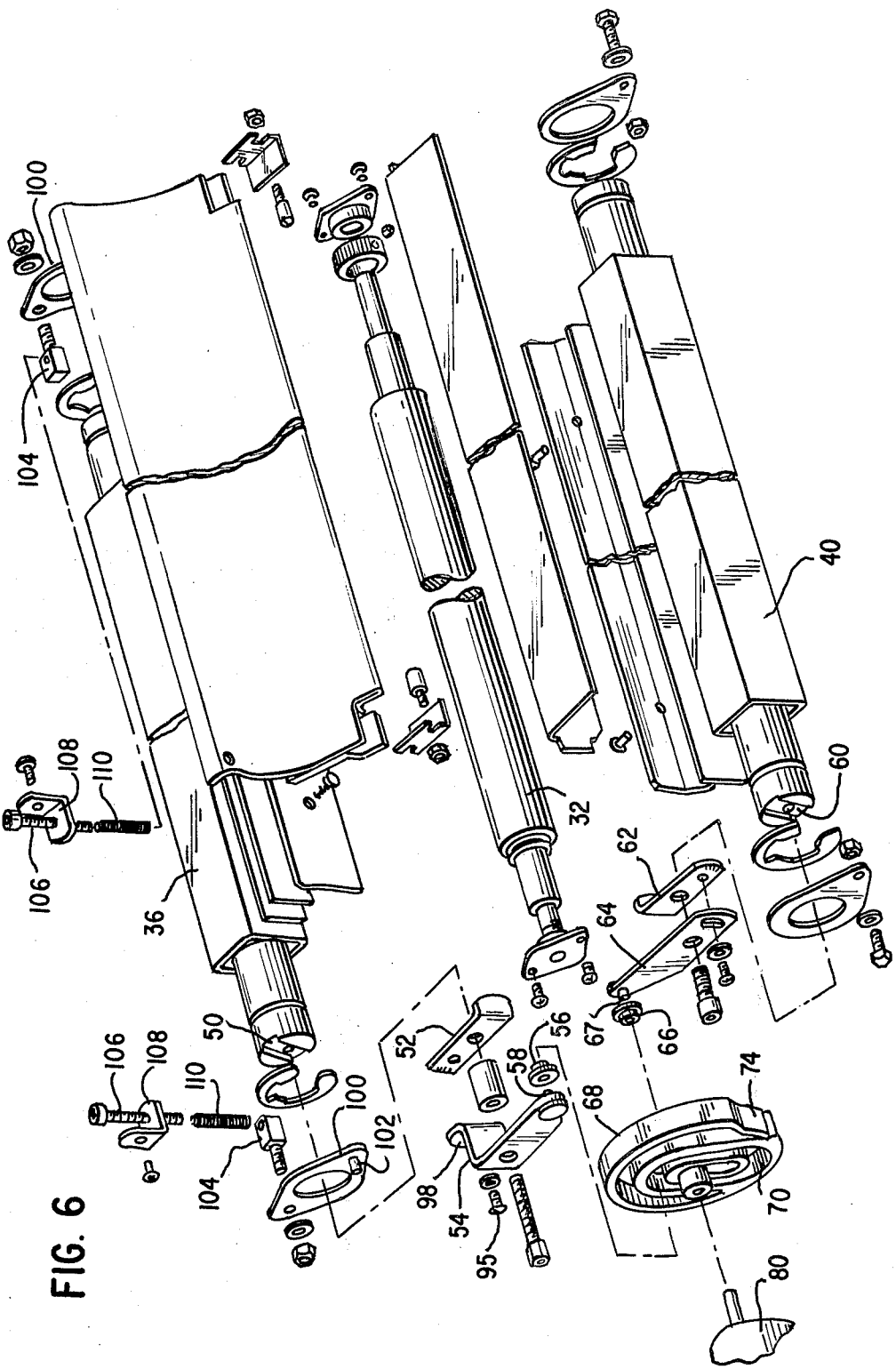

DEVELOPER APPARATUS

BACKGROUND OF THE INVENTION

1. Field of the Invention

This invention relates to the development of photo prints and is particularly applicable in the developing of diazo prints.

2. Description of the Prior Art

As shown for example in U.S. Pat. Nos. 3,702,096; 3,704,661; 3,704,662; 3,969,742 and 4,158,495, a system for developing prints has been created and commercialized in which the metering and application of developer liquid to the sensitized surface of the print paper is brought about by applying the developer liquid to the surface of an applicator roll which has a somewhat resilient microporous surface, and assuring the correct amount of liquid per unit area by applying a metering blade to the roll surface with a predetermined pressure. The roll is rotated and a sheet of exposed print paper, through the offices of a pressure blade, is fed into pressure contact with the portion of the roll surface having the metered deposit of developer. In this manner an accurately controlled developing action is brought about.

While machines using this type of developer application system have been in successful commercial operation for a number of years, it has been found that there is one aspect of their operation which could be made more convenient. This relates to the fact that after a copying machine has been shut down for an extended period and is started up its copy quality tends to suffer slightly unless the machine is allowed to idle for a run-in period of several minutes. The nature of this quality reduction is a nonuniformity of print density which appears as bands where the image is noticeably darker than in the areas between the bands. However, if the machine is allowed to run idle for a short period after start up, the condition is not present and the expected level of uniformity is obtained.

With respect to the obtaining of proper development, the attitude of the metering blade with reference to the surface of the applicator roll determines the amount of developer solution which will be presented per unit area to the surface of the copy sheet. This attitude is accordingly rather critical. Prior machines have included apparatus which permits adjusting the attitude of the metering blade, but this was a relatively permanent setting which required stopping and servicing the machine in order to effect an adjustment, i.e., this was more in the nature of a service adjustment than one in which the operation could perform to meet the needs of the immediate situation.

SUMMARY OF THE INVENTION

Since the width of the more highly developed band was approximately the width of the wick being used, and the spacing of the bands on the point was equal to the circumference of the applicator roll, it was determined that the source of the print nonuniformity was probably a feature of the equipment which involved the use of a wick to bring the developer liquid to the surface of the applicator roll. Further, since the problem did not arise except when the machine was turned off or in standby condition for an extended period, the change in condition of the roll surface, as by drying out, was suspected as the probable cause.

It was finally determined that it was in fact the drying out of the roll which was responsible. The volatile portion of the existing layer of developer material would apparently evaporate, leaving material deposited in the pores of the roll surface which would temporarily impair its ability to accept developer fluid in full measure. Consequently, on start up after an extended shut down period, the roll in most areas would be metering a slightly thinner layer of developer liquid than normal, which would cause a point of slightly less intensity. The problem arose from the fact that the band on the roll surface which had remained in contact with the wick did not dry out, but was held in moistened conditon during the shut down period. Accordingly, at start up, the portions of the copy paper coming into contact with this band area of the developer roll would receive a substantially complete supply of developer immediately, causing the nonuniformity in development. If the roll were allowed to idle before use, the residues in the roll surface pores apparently would gradually redissolve and the operation of the developer roll would shortly return to normal.

It was then discovered that delay in using the machine after a protracted shut down could be avoided by allowing the developer roll surface to dry uniformly during the shut down period. When this was allowed to occur, the first prints made directly after start up would then have an acceptable appearance without the objectionable lack of uniformity previously experienced.

The present invention embodies a device for withdrawing the wick from contact with the roll surface at the time the machine is turned off, substantially in concert with the withdrawal of the metering blade and the pressure blade which had previously been arranged for such withdrawal and restoration motion.

The withdrawal motion of the wick is arranged in a simple and convenient fashion which markedly simplifies the operation and sharply reduces the cost of embodying this feature in the machine. The wick, which is of course made of flexible fabric and which must extend across the full length of the applicator roll (which corresponds with the full width of the widest copy sheet), requires continuous support and is preferably mounted directly upon a wall of the tray which holds the supply of developer solution. In the device of the present invention, the developer tray is mounted for slight bodily shifting movement (e.g. pivotal movement) which is sufficient to cause the wick to move between a position in contact with the applicator roll, and one in which it is out of contact. In a preferred arrangement, an arm on the tray makes frictional contact with one of the elements for supporting and moving the metering blade, and thus avoids any significant augmentation of the mechanical system for producing these motions.

The present invention also includes a means for effecting a very sensitive adjustment in the attitude of the metering blade against the metering roll surface, and one which can be availed of during machine operation, thus greatly assisting the operator in assessing accurately when the proper setting has been attained. By rockably mounting the metering bar mechanism upon adjusting plates, one at each end, and providing a screw control for swinging the adjusting plate at each end of the bar, the present invention makes it possible for the operator to readily effect a sensitive attitude adjustment while the machine is running, to view the results of the changed setting on a test point, and to make an immediate decision as to whether the operation is satisfactory or whether a slight additional refinement in adjustment of the metering blade attitude is required.

BRIEF DESCRIPTION OF THE DRAWING

FIG. 6 is an exploded perspective taken from the front or operator's position showing the applicator roll, the metering blade, the pressure blade and the activating means for the blades;

DESCRIPTION OF THE PREFERRED EMBODIMENT

Figure 1:
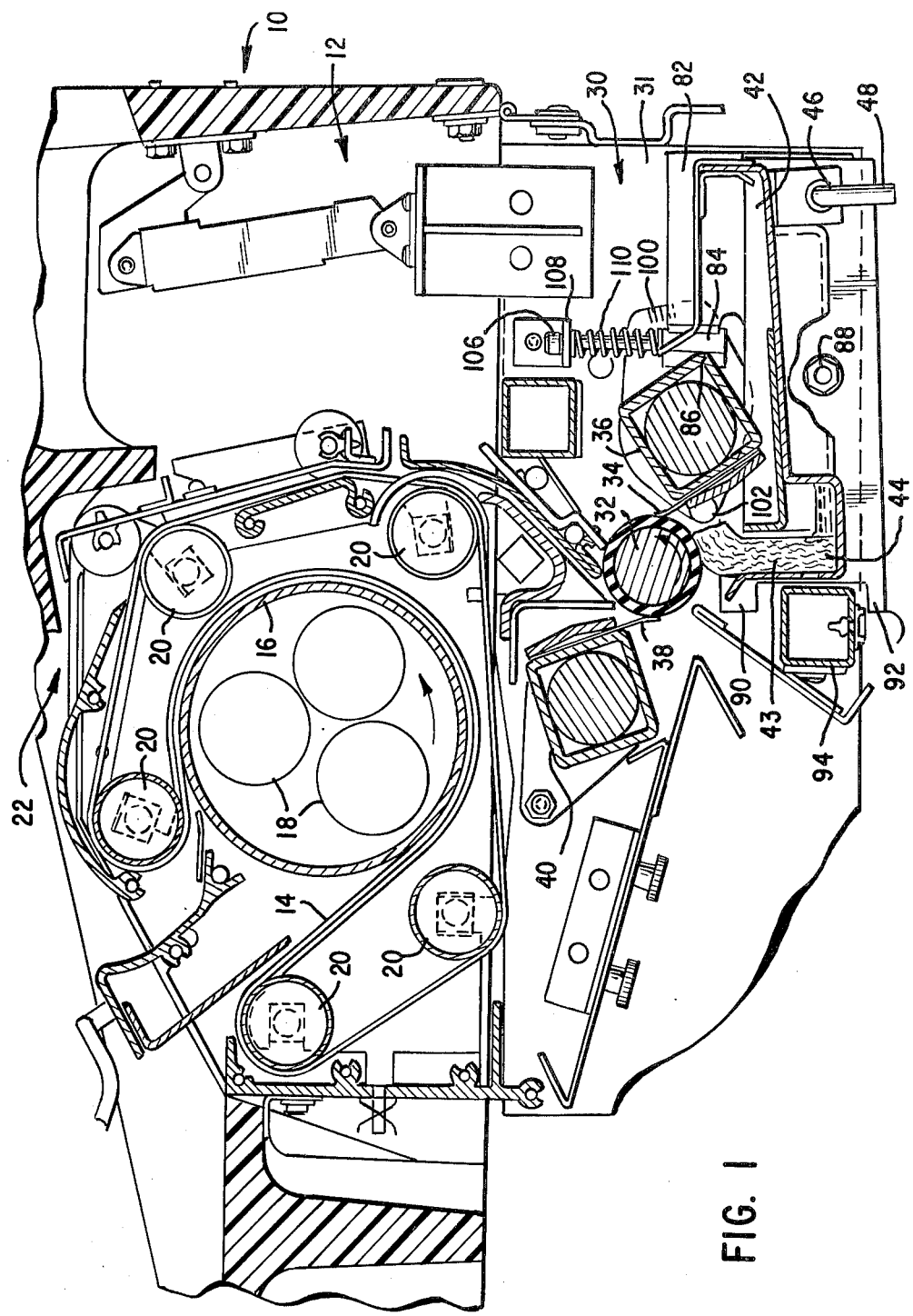
FIG. 1 is a transverse section of a photocopy machine embodying the present invention, and is taken in such direction that the front or operator's side of the machine is to the left, the view being taken from a position at that end of the machine which is to the operator's right.

FIG. 1 illustrates a copying machine 10 of the dizao type embodying an exposure portion 12 and a development portion 30. The exposure portion 12 is generally of a previously known configuration and includes feed belts 14 cooperating with a transparent exposure cylinder 16 which houses exposure lamps 18, and with guide rolls 20 to lead a copy sheet and a translucent original document counterclockwise around the cylinder 16 when the parts are caused to rotate by a conventional motor drive (not shown). As the sheets are progressively exposed their leading edges emerge and are separated by the operator so that the original is caused to move leftward and to be suitably cared for as by manually rolling or passing into a collecting device. The leading edge of the exposed copy sheet is turned towards the right in FIG. 1 and guided into a chute 22 where it comes into contact with an outer run of the belt 14 and is conducted downwardly into the development portion 30 of the machine.

The development portion 30 of the machine is characterized by a frame 31 in which is rotatably mounted an applicator roll 32 having a surface which is slightly resilient and microporous, and is capable of carrying devleoper fluid and depositing it upon the face of a copy sheet, in manner well known. The roll 32 is driven in a counterclockwise direction (as shown) by a suitable conventional power drive, e.g. the means which drives the rolls 20.

In order to accurately control the application of the developer liquid to a copy sheet, a metering blade 34 supported on a metering bar 36 acts against the surface of the applicator roll 32 to determine the amount of liquid developer which the surface of the roll 32 will carry.

On the opposite side of the applicator roll 32 is a pressure blade 38 carried on a pressure bar 40. The blade 38 runs in contact with the applicator roll 32 and, when a copy sheet intervenes, serves to hold the copy sheet firmly in contact with the film of developer on the roll surface.

Means which will be presently described is provided for rotating the bars 36 and 40 so as to move the blades 34 and 38 into and out of contact with the surface of the applicator roll 32.

Figure 2:
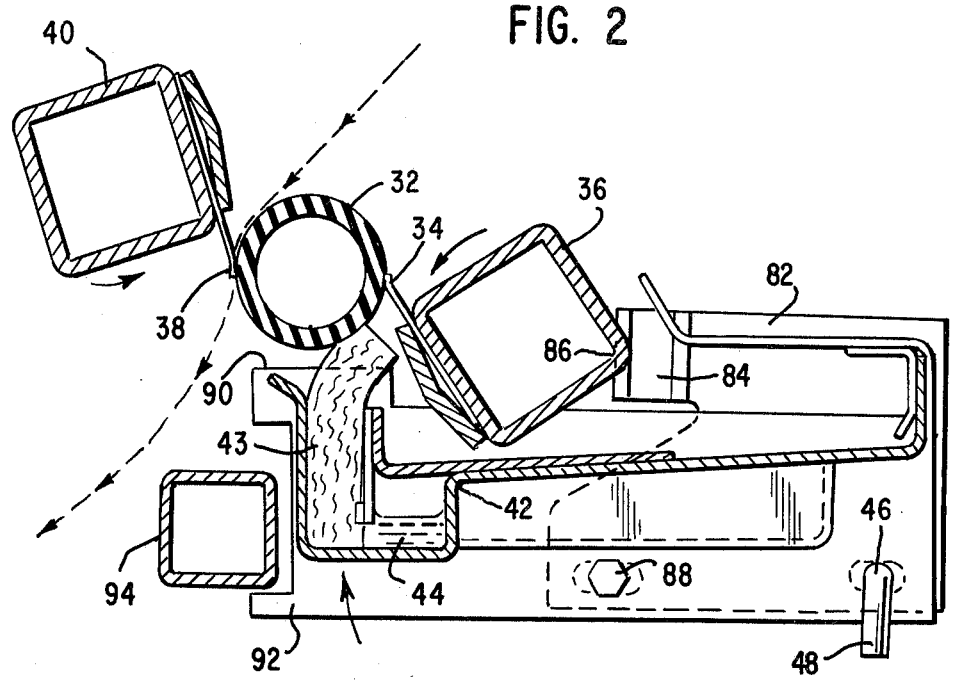
FIG. 2 is a partial section of the development portion of the machine of FIG. 1 showing the parts in operating position.

To bring a supply of developer fluid to the surface of the applicator roll, there is provided a tray 42 extending lengthwise of the machine. Along the side of the tray underlying the applicator roll 32 is mounted an upstanding wick 43 which extends to the bottom of the tray so as to be in contact with a bath 44 of developer in the tray 42 when it has been properly filled. The wick 43 extends upwardly to come into contact with the bottom of the applicator roll when the tray is in normal operating position as seen in FIGS. 1 and 2.

According to the present invention, instead of a fixed tray for holding the bath of developer liquid heretofore customarily used, the tray 42 is pivotally mounted on the frame 31 of the development portion of the machine, the pivot being at that side of the tray remote from the wick 43. In the embodiment shown this pivotal mounting takes the form of two spring pressed pins 46 which may be manipulated by handles 48. The pins are located one at each end of the tray and may be withdrawn to permit release or replacement of the tray as well as permitting its rocking movements.

As previously mentioned, there is provided known means for executing the rocking motion of the bars 36 and 40 so as to move the blades 34 and 38 between active and standby positions. Referring to FIG. 6, it can be seen that the metering bar 36 is provided at one end with a slot 50 into which is fitted a key 52 for driving connection therewith, and bolted thereto is a bracket 54 whose tip carries a cam follower roller 56 on a pin 58 directed towards the interior of the machine. The pressure bar 40 is similarly equipped with a slot 60, key 62, an arm 64 which in this case is bolted directly to the face of the key and carries at its tip a cam follower roller 66 mounted upon a pin 67 which, in this case projects away from the interior of the machine.

Figure 7:
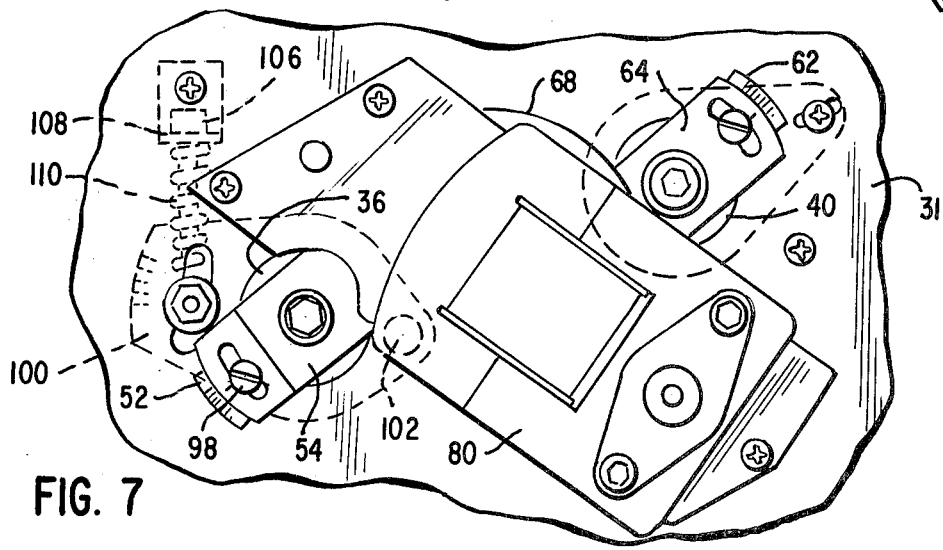
FIG. 7 is a detail elevation showing the adjustment means for setting the metering blade pressure and is taken from a position at the end of the machine to the operator's left.

The cam follower rollers are designed to cooperate with face cam grooves formed on the opposite faces of a cam member 68. On the outwardly directed face of the cam 68 is a groove 70 receiving the roller 56, and on the inwardly directed face is a cam groove 72 receiving the roller 66. The cam is shown in detail in FIGS. 4a, 4b, 5a and 5b, in which it can be seen that the cam also includes a peripheral notch 74 for coacting with electrical control switches 76 and 78 for a purpose which will presently appear. The cam is connected to and driven by the shaft of a blade positioning motor 80, FIGS. 6 and 7.

Figure 3:
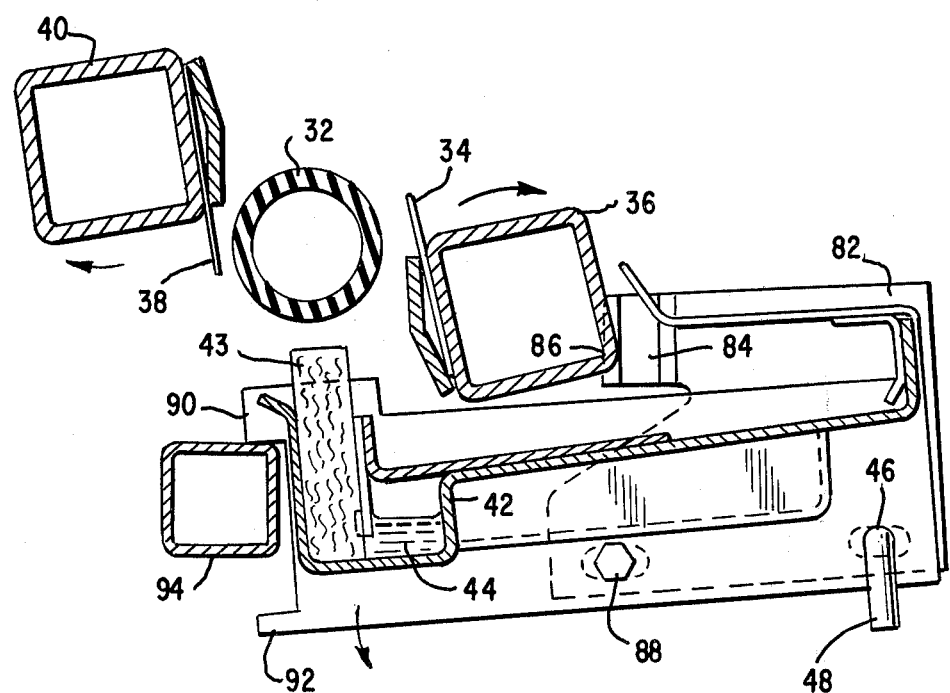
FIG. 3 is a view similar to FIG. 2 but showing the parts in standby position.
Figure 4A:
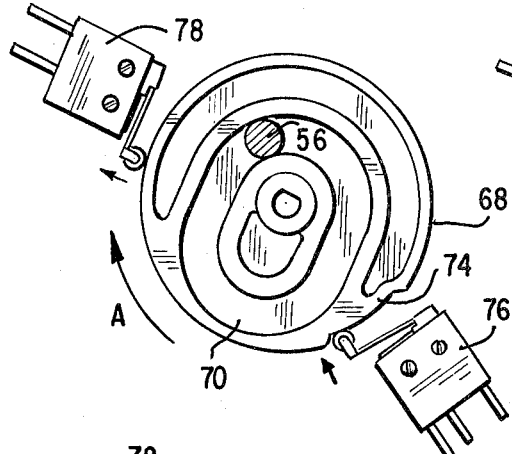
FIG. 4a is a diagrammatic elevation of the blade positioning cam showing the face thereof which controls the positioning of the metering bar, and also showing the follower elements cooperating with the cam, the parts being shown in the positions they would occupy when the machine is in operation, and the view being taken from a position to the left of FIG. 6 (i.e. the end of the machine which is to the operator's left.)
Figure 4B:
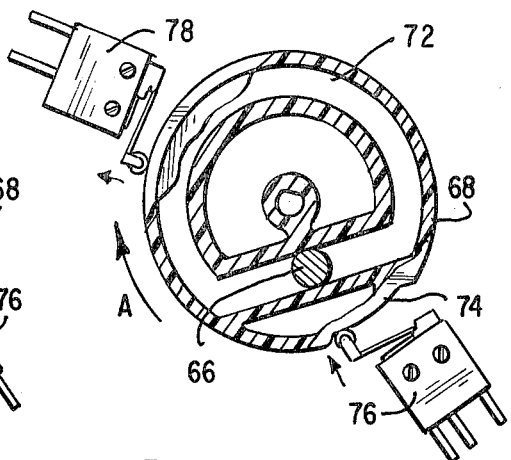
FIG. 4b is a view similar to FIG. 4a but partially sectioned so as to show the grooves on the reverse face of the cam which control the positioning of the pressure bar, together with the follower element associated with the pressure bar.
Figure 5A:
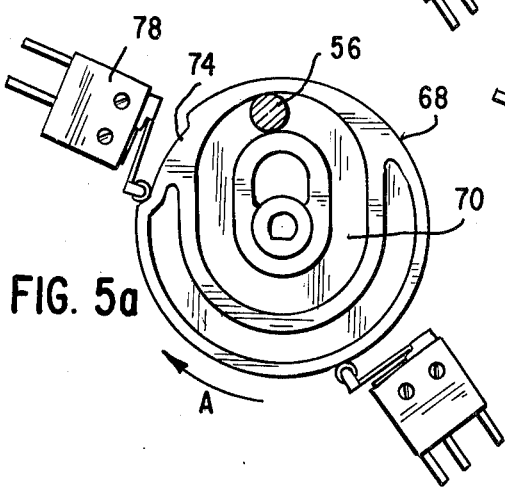
FIGS. 5a and 5b are views similar to FIGS. 4a and 4b respectively, but showing the parts in the positions they would occupy when the machine is in standby condition.
Figure 5B:
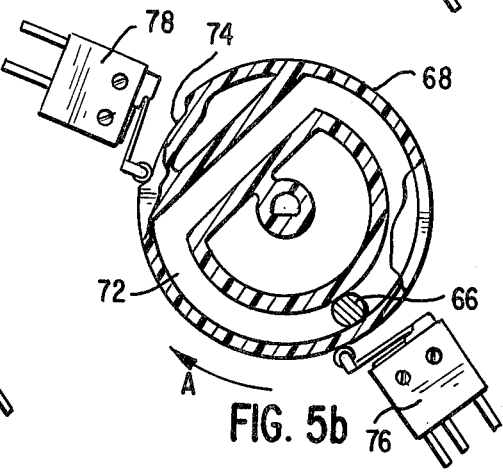

The operation of the cam positioning motor 80 is as follows, the parts being assumed to be initially in the position of FIGS. 5a and 5b with the machine off and the blades 34 and 38 out of contact with the applicator roll 32 as seen in FIG. 3. A print switch (not shown) is manually turned on, and this acts to start rotation of the applicator roll 32, and, in combination with the now closed switch 76, to energize the motor 80 causing the cam 68 to start turning in the direction of arrow A. This action first causes follower 56 to move the metering blade 34 into contact with the applicator roll 32, and then to cause the follower 66 to move the pressure blade 38 into contact, and finally the switch 76 opens when it encounters the notch 74, thereby deenergizing the positioning motor 80 to stop the cam and to transfer control, as by a relay, to now closed switch 78 in combination with an "off" actuation of the print switch. The motor 80 and cam 68 remain stationary as long as the machine is in use for copying, and occupy the position of FIGS. 4a, 4b during this running period, the blades 34 and 38 being in the position shown in FIG. 2.

When the operator wishes to return the machine to standby condition, he operates the print switch to "off" or non-print position. This stops rotation of the applicator roll 32 and, acting in combination with switch 78 which is now closed, energizes the positioning motor 80 to rotate the cam 68 again in the direction of the arrow A until the parts again reach the position shown in FIGS. 5a, 5b. During this transit the pressure blade and the metering blade are moved out of contact with roll 32, and when the notch 74 reaches the switch 78, the latter opens deenergizing the positioning motor 80 and transferring control back to switch 76 in combination with an "on" actuation of the print switch.

The foregoing description is for the purpose of laying the groundwork for understanding certain features of the present invention, and explaining briefly the mechanism for rocking the metering bar 36 between the position in which it holds the metering blade 34 out of contact with the applicator roll and the operative position in which the metering blade 34 is in metering contact.

The previously described pivotal mounting of the tray 42 is for the purpose of moving the wick 43 into and out of contact with the applicator roll 32, and represents the presently preferred way of moving the wick since it avoids the problem of having to take the liquid level in the tray into account as would be the case if the wick were moved independently of the tray.

A highly efficient and extremely simple arrangement has been devised for driving the tray in its pivotal motion. This arrangement takes advantage of the rocking motion of the metering bar 36 and requires merely that each end of the tray be provided with a bracket. Each of the brackets is provided with a wear-resistant friction pad 84, preferably of a suitable synthetic polymer, so disposed as to face the metering bar 36 and to interfere slightly with the same as it is rocked. It has been found that the noncircular shape of the bar 36 is an advantage in this regard in that the corner edge 86 of the bar serves as a particularly effective driving element for making contact with the friction pad 84. As seen in FIGS. 2 and 3, the bracket 82 can be adjusted horizontally and clamped in place by a bolt 88. It will also be noted that the tray end plates are each provided with projecting ears 90 and 92 which coact with a tie bar 94 on the machine to determine the limits of up and down movement of the tray.

By raising the tray 42 until the ears 92 are both in contact with tie bar 94, and rotating the metering bar 36 clockwise to full operating position, a 0.010 inch feeler gauge between the corner 86 of the bar 36 and the friction pad 84 will determine correct clearance for proper operation and the brackets 82 can be thus adjusted and clamped. When the feeler gauge is withdrawn, the ears 92 will drop very slightly away from the bar 94 until the friction pad 84 makes firm contact with the edge 82 and the wick 43 assumes the correct angle of contact with the applicator roll 32 as shown in FIG. 2. Then, whenever the metering bar 36 is moved to standby position, its edge 86, acting on the friction pad 84, pivots the tray 42 to lowered position with the ear 90 resting on the bar 94 and the wick 43 out of contact with the applicator roll 32 as in FIG. 3. During these motions the wick 43, thus activated, is the first element to make contact with the roll 32 when going into operation and the last element to escape from roll contact when returning to standby condition.

From the foregoing discussion it can be seen that whenever the machine is turned off the positioning motor 80 and cam 68 cause the blades 38 and 34 to withdraw from contact with the applicator roll 32. The withdrawal of metering blade 32 also activates withdrawal of the wick 43 through the action of the edge 86 of the metering bar 36 upon the friction pad 84, which causes the tray 42 to pivot to a lower position.

Since the wick is now out of contact with the applicator roll 32, if the period of standby should be long enough for drying of the roll surface to occur, such drying will occur uniformly and portions of the roll sruface will not be maintained in moistened condition by wick contact.

When the machine is activated after shut down, the action of the positioning motor and cam, again acting through the edge 86 of the metering bar 36 and the friction pad 84, will automatically cause the tray 42 to pivot upwardly, thereby causing the wick 43 to move into contact with the surface of the applicator roll 32 just ahead of the metering blade and the pressure blade to restore normal developing operation without requiring any run-in delay.

The arrangement for securing a correct attitude setting of the metering blade 34 against the applicator roll to insure correct development includes the key 52 and the bracket 54 seen in FIG. 6. These are relatively angularly shiftable about the shaft axis and can be clamped in various angular relationships by a screw 95 threaded into an opening 96 in the key 52 and passing through an arcuate slot 98. This is a formerly known arrangement which allows the metering bar 36 to be set at various angles with respect to a given position of follower roller 56 in its cam groove 70. It provides an effective way of adjusting blade attitude, but is a rather difficult adjustment for an operator to perform, and cannot, in a practical sense, be made while the machine is developing a print.

To provide an improved arrangement which allows more refinement in blade attitude adjustment and provides an adjustment which can be changed during machine operation, the metering bar, instead of having a mounting which is substantially fixed with respect to the side plates, is mounted near each of its ends for rotation in a swinging support plate 100. One of the plates can be seen in FIG. 1 and FIG. 7 and both appear in FIG. 6. Each plate has a pivotal mounting on the frame 3 as indiacted at 102. To the free end of each support plate 100 is rockably attached to a block 104 which has a threaded opening which threadedly receives the end of an adjusting screw 106. The screw is loosely supported in an opening in a guide bracket 108 attached to the frame 31, and a compression spring 110 surrounds the screw 106 and is trapped between the block 104 and the bracket 108. The compression spring 110 serves to maintain the head of the adjusting screw against the guide bracket 108 and to prevent vibration from changing the adjustment.

With the construction as just described it is possible to determine the attitude relative to the applicator roll 32 of the metering blade 34 in a very precise manner. Initially the angle between the key 52 and the bracket 54 is adjusted to give an approximately correct blade attitude. Then the machine is started and a test print in introduced into the developer portion 30 of the machine. If the print develops too rapidly or appears to be over-developing, the screws 106 can both be loosened (rotated counterclockwise) by an equal amount to cause the blade 34 to assume a more pronounced edgewise attitude relative to the roll 32, which increases the squeegee effect and reduces the amount of liquid developer on the roll surface available for application to a copy sheet. On the other hand, if the print appears to be developing too slowly or appears to be turning out too light, the screws 106 can be tightened (rotated clockwise) by an equal amount to cause the blade 34 to attack the roll 32 in a more nearly tangential fashion which allows a slightly increased deposit of developer to remain on the roll surface, resulting in increased developing action.

The screws 106 are so positioned that the operator has ready access to the screw heads from the top of the machine while the machine is operating so that the results of a changed blade setting are directly and immediately observable.

While certain embodiments and features of the invention have been described in detail herein, it will be understood that alterations and modifications may be made without departing from the scope and spirit of the invention as defined in the appended claims.

What is claimed is:

1. Apparatus for developing copy material bearing a latent image comprising:
   an applicator roll for applying liquid developer to copy material to be developed;
   blade means for controlling the development action upon the copy material of liquid developer carried on the surface of said applicator roll;
   means including a wick for supplying liquid developer to the surface of the applicator roll;
   means for moving said wick into and out of contact with the surface of the applicator roll; and
   means for automatically moving said blade means into or out of contact with the applicator roll in response to turning the apparatus on or off, the means for moving said wick being mechanically associated with said blade means so as to be driven directly by the movement thereof.

2. Apparatus as set forth in claim 1 in which the means for supplying liquid developer includes a tray for holding a bath of the liquid developer, in which the wick is mounted on the tray, and in which the means for moving the wick into and out of contact with the surface of the applicator roll comprises means for shifting the position of the tray to control the position of the wick.

3. Apparatus as set forth in claim 2 in which the blade means includes a rocking bar upon which a blade is mounted, and means to rock the bar through an angle sufficient to place the blade in operating contact with the applicator roll or withdraw it therefrom, and in which the means for shifting the positon of the tray comprises a friction pad on the tray positioned to be driven by contact with said rocking bar.

4. Apparatus as set forth in claim 3 in which the tray is pivoted at a point remote from the wick mounted thereon, and the action of the rocking bar upon the friction pad so moves the tray as to move the wick out of contact with the applicator roll when the blade is moved out of contact with the applicator roll and into contact with the applicator roll when the blade is moved into contact with the applicator roll.

5. Apparatus as set forth in claim 1 in which the blade means includes: a metering blade for controlling the amount of liquid developer on the surface of the applicator roll; and a rocking bar for supporting said metering blade, said bar being supported for rocking movement by support members, one adjacent each and, the apparatus further including:
   means mounting said support members for shifting movement transversely of the axis of said applicator roll in a direction to increase or decrease the squeegee action applied to the surface of the applicator roll by said metering blade; and
   screw means associated with support members for accurately controlling the shifting movement thereof, and being so disposed as to be accessible for operator manipulation while the developing apparatus is in operation.

6. Apparatus for developing copy material having a latent image comprising:
   an applicator roll for applying liquid developer to copy material to be developed;
   a metering blade for controlling the amount of liquid developer on the surface of the applicator roll;
   a rocking bar supporting said metering blade, said bar being supported for rocking movement by support members, one adjacent each end;
   means mounting said support members for shifting movement transversely of the axis of said applicator roll in a direction to increase or decrease the squeegee action applied to the surface of the applicator roll by said metering blade;
   screw means associated with support members for accurately controlling the shifting movement thereof, and being so disposed as to be accessible for operator manipulation while the developing apparatus is in operation; and
   means for automatically moving said metering blade into and out of contact with the applicator roll in response to turning the apparatus on or off.

* * * * *